G. R. NEBINGER.
Piston-Packing.

No. 203,639. Patented May 14, 1878.

Witnesses.

Inventor:

UNITED STATES PATENT OFFICE.

GEORGE R. NEBINGER, OF PHILADELPHIA, PENNSYLVANIA.

IMPROVEMENT IN PISTON-PACKINGS.

Specification forming part of Letters Patent No. 203,639, dated May 14, 1878; application filed October 17, 1877.

*To all whom it may concern:*

Be it known that I, GEORGE R. NEBINGER, of the city and county of Philadelphia, and State of Pennsylvania, have invented a new and useful Improvement in Piston-Packing, which improvement is fully set forth in the following specification and accompanying drawing, in which—

Figure 1:
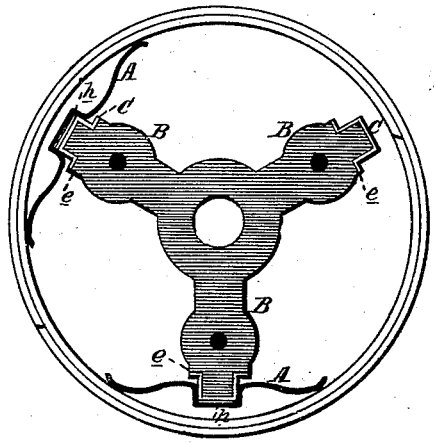
Figure 2:
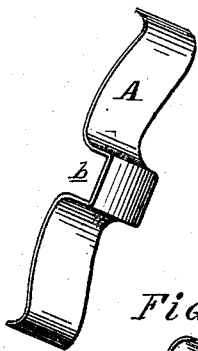
Figure 4:
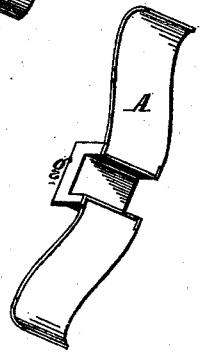
Figure 3:
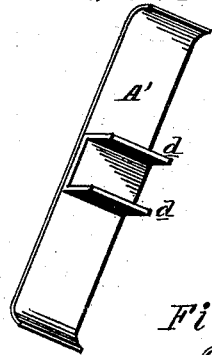
Figure 5:
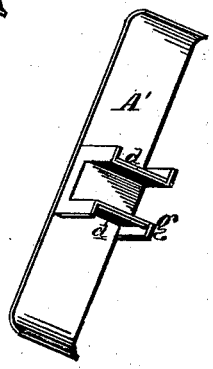

Figure 1 is a plan view of my improvement in piston-packing, with the follower of the piston removed. Figs. 2 and 3 are perspective views of springs for pressing out the packing-rings, showing the peculiar forms adopted in my invention. Figs. 4 and 5 are also perspective views of springs, showing a bushing or lining applied to the same to prevent corrosion while in contact with the spider of the piston-head.

The object of my invention, which relates to the springs for pressing out the packing-rings, is to construct each spring with an open recess or channel, so as to be applied to the arms of the spider or arms radiating from the central hub, and embrace the ends of the same in such a manner as to remain at all times in proper position, avoiding all possibility of sliding to and fro on the packing-rings, and to retain the full strength of the springs by dispensing with the opening in the spring as usually employed for the steady-pin.

Each spring A is forged to the shape as shown in the detached view, Fig. 2, with the center part bowed to form an open recess, or what may be termed an "open pocket," b, which fits over the ends of the spider-arms or arms radiating from the central hub of the piston, and embraces the vertical sides of the same in such a manner as to retain the springs at all times in proper position within the piston-head without the interposition of any other device. By this simple means of adjustment the springs may be readily introduced into the piston, or withdrawn, if necessary, and at the same time are not liable to get out of order.

A', Figs. 3 and 5, shows a modification of my invention. In this instance the spring is provided with double ribs or projections d d on the back part, arranged a certain distance apart, and extending the full width of the spring, in order to form an open space, similar to the recess in the spring A, and to fit over the ends and embrace the vertical sides of the radiating arms. The ends of the radiating arms B are formed with shoulders e e, Fig. 1, for the jaws of a wrench to bear against, and a thin metal packing, h, is introduced in the recess or pocket when the spring is to be set up against the packing-rings.

The ends of the radiating arms B B, Fig. 1, or the supplementary arms radiating from the central hub, to which the springs are applied, are covered with sheet-brass or other non-corrosive metal, c, to prevent the iron corroding and injuring the springs; or the springs may be lined with non-corrosive metal instead of the arms, in which case the bushing is placed in the recess or pocket of the spring with the ends turned over, as shown at g, Figs. 4 and 5, to hold the same in place.

The spring bowed, as shown at A, Fig. 2, to form a recess, or constructed, as shown at A', with ribs d d, may be adapted to other use than piston-packing, such as carriages, or for supporting a bed or platform where elasticity is required. In either case the sides of the recess or ribs afford means for attaching the spring in place.

What I claim as my invention is—

In combination with the radiating arms B B, the spring A, bowed in the center to form a recess or channel, and adapted to fit over the ends of the said arms, substantially in the manner and for the purpose shown and described.

GEORGE R. NEBINGER.

Witnesses:
   J. A. WHITE,
   ALEXANDER H. MORGAN.